United States Patent
Trinidad et al.

(10) Patent No.: US 8,909,198 B1
(45) Date of Patent: Dec. 9, 2014

(54) CUSTOMIZED DIALING PROCEDURES FOR OUTBOUND CALLS

(71) Applicant: Noble Systems Corporation, Atlanta, GA (US)

(72) Inventors: Juderic Trinidad, Atlanta, GA (US); Jason P. Ouimette, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 13/719,800

(22) Filed: Dec. 19, 2012

(51) Int. Cl.
*H04M 11/10* (2006.01)
*H04M 3/533* (2006.01)
*H04M 3/42* (2006.01)
*H04M 3/00* (2006.01)
*H04M 1/64* (2006.01)

(52) U.S. Cl.
CPC .......... *H04M 3/42263* (2013.01); *H04M 3/533* (2013.01)
USPC ................. 455/413; 379/211.03; 379/216.01; 379/217.01; 379/266.08; 379/69

(58) Field of Classification Search
USPC ............................................... 455/413, 414.1
See application file for complete search history.

(56) References Cited

U.S. PATENT DOCUMENTS

| | | | | |
|---|---|---|---|---|
| 5,644,629 | A * | 7/1997 | Chow | 379/142.07 |
| 5,809,113 | A * | 9/1998 | Lieuwen | 379/69 |
| 5,889,799 | A * | 3/1999 | Grossman et al. | 379/266.08 |
| 2002/0141557 | A1 * | 10/2002 | Strandberg | 379/210.01 |
| 2003/0002645 | A1 * | 1/2003 | Worsham et al. | 379/211.03 |
| 2004/0170258 | A1 * | 9/2004 | Levin et al. | 379/88.01 |
| 2007/0064909 | A1 * | 3/2007 | Levy et al. | 379/211.03 |
| 2009/0067608 | A1 * | 3/2009 | Cox et al. | 379/218.01 |
| 2010/0172484 | A1 * | 7/2010 | Leung et al. | 379/216.01 |
| 2010/0232590 | A1 * | 9/2010 | Smelyansky | 379/216.01 |

FOREIGN PATENT DOCUMENTS

KR 1019980055728 * 12/1998

OTHER PUBLICATIONS

Sony Corp., Louis Howard Weiss, "Automatic Page Afterunanswered Cellular/Landline Phone Call", Nov. 1, 2000.*
Anonymously, "Automating the Population of Outbound Dialer Calling Lists", Jul. 25, 2007.*
Maestro 2010.1.1 User Manual, vol. Two, Aug. 3, 2010, 416 pages, Noble Systems Corporation, Atlanta GA 30319.
Maestro 2010.1.1 User Manual, vol. 1, Aug. 17, 2010, 454 pages, Noble Systems Corporation, Atlanta, GA.
Nobles Systems Corporation, Maestro 2010.4.1 User Manual, vol. 1, Jan. 11, 2012, 486 Pages, Noble Systems Corporation, Atlanta, GA 30319.
Nobles Systems Corporation, Maestro 2010.4.1 User Manual, vol. 2, Jul. 19, 2011, 422 Pages, Noble Systems Corporation, Atlanta, GA 30319.

* cited by examiner

*Primary Examiner* — Timothy Pham (57) ABSTRACT

Various embodiments of the invention provide methods, systems, and computer program products for selecting a first telephone number associated with an account for a targeted party and dialing the first telephone number to place an outbound call to the party. Accordingly, in particular embodiments, the first telephone number may be dialed to place a subsequent call after a first predetermined period of time as a result of detecting a busy signal for the initial call. Likewise, in particular embodiments, the first telephone number may be dialed to place a subsequent call after a second predetermined period of time as a result of detecting an automated answering device for the initial call. Furthermore, in particular embodiments, a second telephone number associated with the account for the party may be selected and dialed to place a subsequent call as a result of detecting a no-answer condition for the initial call.

27 Claims, 6 Drawing Sheets

CUSTOMIZED DIALING PROCEDURES FOR OUTBOUND CALLS

BACKGROUND

Call centers may originate telephone calls (known as outbound calls) to targeted parties for various purposes. For instance, outbound calls may be made by call centers for the purpose of surveying individuals for a political campaign, notifying customers of suspicious charges on their credit card accounts, inquiring about repayment of past due loan amounts, soliciting donations for a non-profit organization, or offering new products for sale. In many instances, the call center may encounter a number of different results (e.g., outcomes) in placing a particular outbound call besides reaching the intended (e.g., targeted) party. For example, the called telephone may be busy or disconnected, automated answering may answer the call such as voice mail or an answering machine, or the call may continuously ring until the call is terminated. Regardless of the result, a call center typically continues on with the next number in a calling list and may eventually try to reach the intended party at a later time by making a subsequent outbound call to the party. As a result of this practice, many call centers encounter decreased efficiency and effectiveness in conducting outbound call campaigns. Thus, a need in the art exists for improved procedures for handling instances in which the intended party is not reached when conducting outbound calls. It is with respect to these considerations and others that the disclosure herein is presented.

BRIEF SUMMARY

In general, embodiments of the present invention provide computer program products, methods, systems, apparatus, and computing entities for selecting a first telephone number associated with an account for a targeted party and dialing the first telephone number to place an outbound telephone call to the targeted party. Accordingly, in particular embodiments, the first telephone number may be automatically dialed (e.g., redialed) to place a subsequent outbound telephone call to the targeted party after a first predetermined period of time as a result of detecting a busy signal for the initial outbound telephone call. Likewise, in particular embodiments, the first telephone number may be automatically dialed (e.g., redialed) to place a subsequent outbound telephone call to the targeted party after a second predetermined period of time as a result of detecting an automated answering device for the initial outbound telephone call. For instance, in particular embodiments, the automated answering device may comprise at least one of a voice mail and an answering machine. Depending on the embodiment, the first predetermined period of time may be different than the second predetermined period of time. In addition, in particular embodiments, the first predetermined period of time and the second predetermined period of time may be specified by the account for the targeted party. Further, in particular embodiments, the subsequent outbound telephone call is placed to the targeted party after the first predetermined period of time as a result of an attempt to reach the targeted party by placing the subsequent outbound telephone call not being greater than a first attempt value, and/or the subsequent outbound telephone call is placed to the targeted party after the second predetermined period of time as a result of the attempt to reach the targeted party by placing the subsequent outbound telephone call not being greater than a second attempt value.

Furthermore, in particular embodiments, a second telephone number associated with the account for the targeted party may be automatically selected and dialed to place a subsequent outbound telephone call to the targeted party as a result of detecting a no-answer condition for the initial outbound telephone call. For instance, the first telephone number for the targeted party may be associated with a landline telephone device and the second telephone number for the targeted party may be associated with a wireless communication device. Thus, in this instance, after a no-answer condition is detected for the initial outbound call placed to the targeted party's landline telephone device, a subsequent outbound telephone call is placed to the targeted party's wireless communication device (e.g., cell phone). In addition, in particular embodiments, the no-answer condition for the initial outbound telephone call is detected by not detecting a busy signal or an automated answering device after a predetermined number of ring cycles. While in other embodiments, the no-answer condition for the initial outbound telephone call is detected by detecting an out-of-service condition for the first telephone number. Finally, in particular embodiments, the first telephone number may be initially selected because the account for the targeted party indicates the first telephone number has priority over the second telephone number.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

Figure 1:
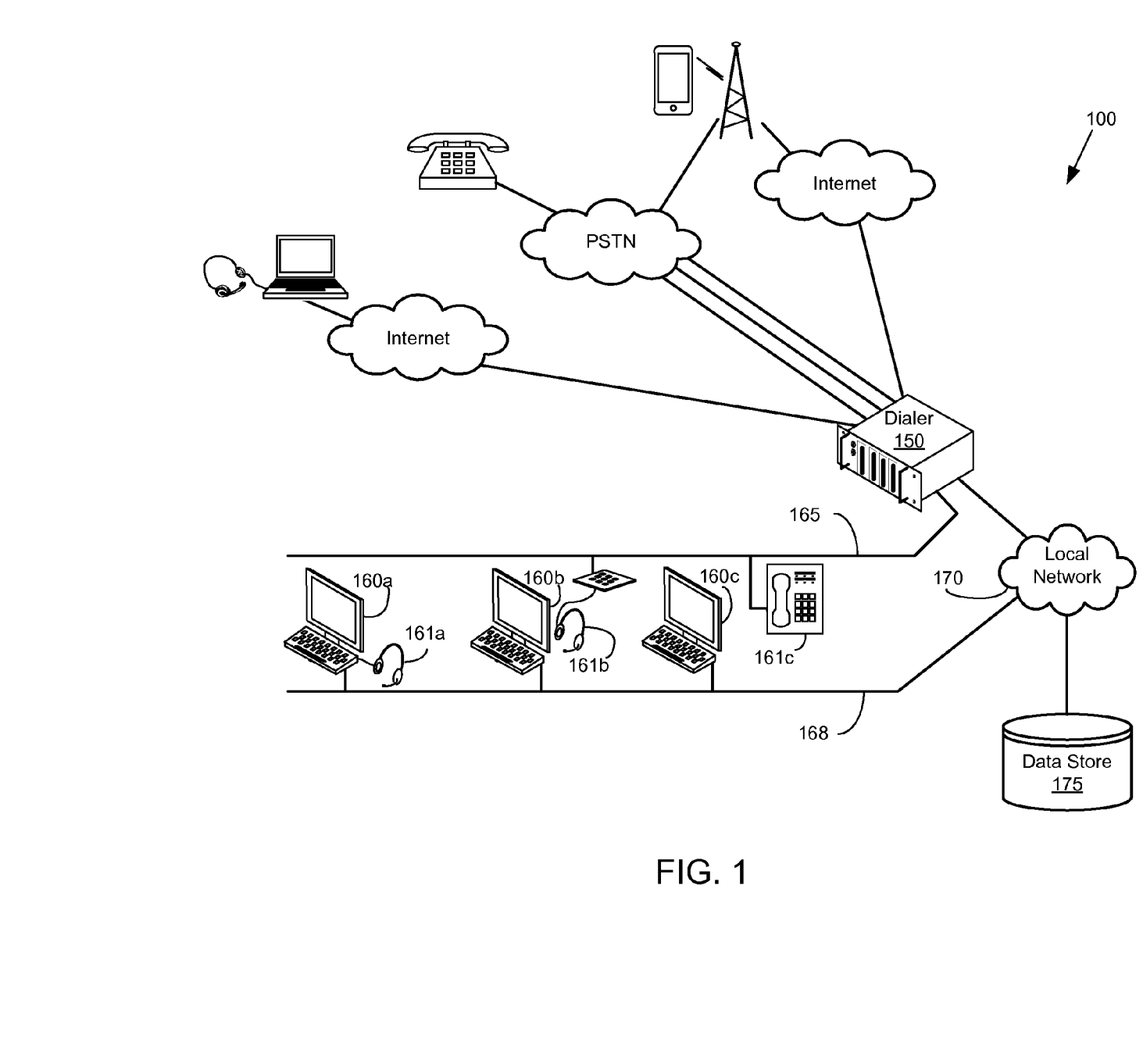
FIG. 1 illustrates an architecture of a call center which may employ the various technologies disclosed herein.

FIG. 1 shows one embodiment of a call center architecture 100 illustrating the various technologies disclosed herein. The call center architecture 100 shown in FIG. 1 may involve voice calls that originate from the call center. Although many aspects of call center operation are disclosed in the context of voice calls, in various embodiments, the call center may process other forms of communication such as, for example, facsimiles, emails, text messages, video calls, and chat messages. That is, in various embodiments, the call center may be considered a contact center. However, for purposes of this disclosure, the term "call center" is used throughout, although it is understood that the principles may apply to a contact center.

In various embodiments, the call center employs a dialer 150, such as a predictive dialer, to originate outbound calls on behalf of one or more agents at a rate designed to meet various criteria. Depending on the embodiment, each outbound call originated by the dialer 150 may be directed to any number of devices associated with a targeted party such as, for example, a computer, telephone, or mobile device. In addition, similar to the other components within the call center architecture 100, in particular embodiments, the dialer 150 may comprise one or more software modules executing on a processing device hardware platform.

In various embodiments, the dialer 150 originates outbound calls by processing one or more dialing lists comprising a collection of records providing contact information (e.g., account numbers, telephone numbers, etc.) for placing the outbound calls. Thus, depending on the embodiment, the dialing list(s) may include hundreds or thousands of records and the records may or may not be sorted in any particular order. In addition, depending on the embodiment, the dialer 150 may or may not dial the records in the dialing list(s) in sequence.

In particular embodiments, the collection of records is retrieved from a data store 175 to compile the dialing list(s). Depending on the embodiment, the data store 175 may comprise any number of different types of storage media and may be configured to store the collection of records in a number of different ways. For instance, in one embodiment, the data store 175 may comprise SAN storage or NAS storage that includes one or more databases for storing the collection of records.

In addition, in particular embodiments, one or more records in the collection of records may include multiple contact information (e.g., multiple telephone numbers) for a particular targeted party. For example, one or more records for a particular targeted party in the collection of records may include a telephone number to a landline device associated with the particular targeted party and a telephone number for a wireless communication device (e.g., a cell phone) associated with the particular targeted party. In particular instances involving multiple contact information, the records may also include information for prioritizing the multiple contacts. That is, in particular instances, the records may provide an order in which the multiple contacts should be used to attempt to reach the party. For example, in one instance, the records may indicate that the call center should first dial the telephone number for the particular targeted party's landline device to attempt to contact the particular targeted party before dialing the telephone number for the particular targeted party's wireless communication device to attempt to contact the particular targeted party.

Furthermore, certain records may include additional information (e.g., rules) on how a particular targeted party should be contacted. For instance, in particular embodiments, the one or more records for a particular targeted party may include one or more time periods that indicate amounts of time that should elapse after an initial outbound call is placed to the particular targeted party before a subsequent outbound call should be placed to the party under certain conditions. For example, in one instance, the records may include a time period that indicates an amount of time that should elapse before a subsequent outbound call is placed to a particular targeted party after receiving a busy signal for the initial outbound call placed to the party.

Once a targeted party is reached, in various embodiments, the dialer 150 connects the outbound call to one of a plurality of call center agents. For instance, in particular embodiments, the dialer 150 connects the outbound call over facilities 165 to an agent for servicing so that the targeted party may speak with the agent. The physical area at which the agent sits is often referred to as an agent "position" and these positions are often grouped into clusters managed by a supervisor, who may monitor calls and the agents' productivity. An agent typically uses a computing device 160a-160c, such as a computer, and a voice device 161a-161c. In particular embodiments, data may be provided to an agent's workstation computer 160a-160c over facilities 168 along with routing the call to the agent's workstation phone 161a-161c. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to the voice device 161a-161c at the agent's position. Similarly, "routing the call to the agent" means routing a call to the appropriate equipment at an agent's position.

The above components may be referred to as a "computing device," "processing device," or "system." In addition, one or more of the components may incorporate a local data store and/or interface with an external data store. Depending on the embodiment, interaction between these components (e.g., the dialer 150, the data store 175, and agent computers 160a-160c) may involve using a local area network ("LAN") 170. However, other configurations are possible, such as, but not limited to, using a wide area network, wireless network, router, bridge, direct point-to-point links, etc. Further, the above components may be located remotely from (or co-located with) other components. Furthermore, one or more of the components may be implemented on a single processing device to perform the functions described herein. For example, in various embodiments, the functionality of the dialer 150 may also be incorporated with other call center components. In addition, in particular embodiments, the call center architecture 100 may be provided as a hosted solution, where the call processing functionality is provided as a communication service (a so-called "communication-as-a-service" or "CaaS") to a call center operator. Thus, there is no requirement that the components identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences.

Those skilled in art will recognize FIG. 1 represents one possible configuration of a call center architecture 100, and that variations are possible with respect to the protocols, facilities, components, technologies, and equipment used. For example, various algorithms and queuing arrangements may be defined to efficiently process calls to agent and/or place outbound calls.

Process Flow

Figure 2A:
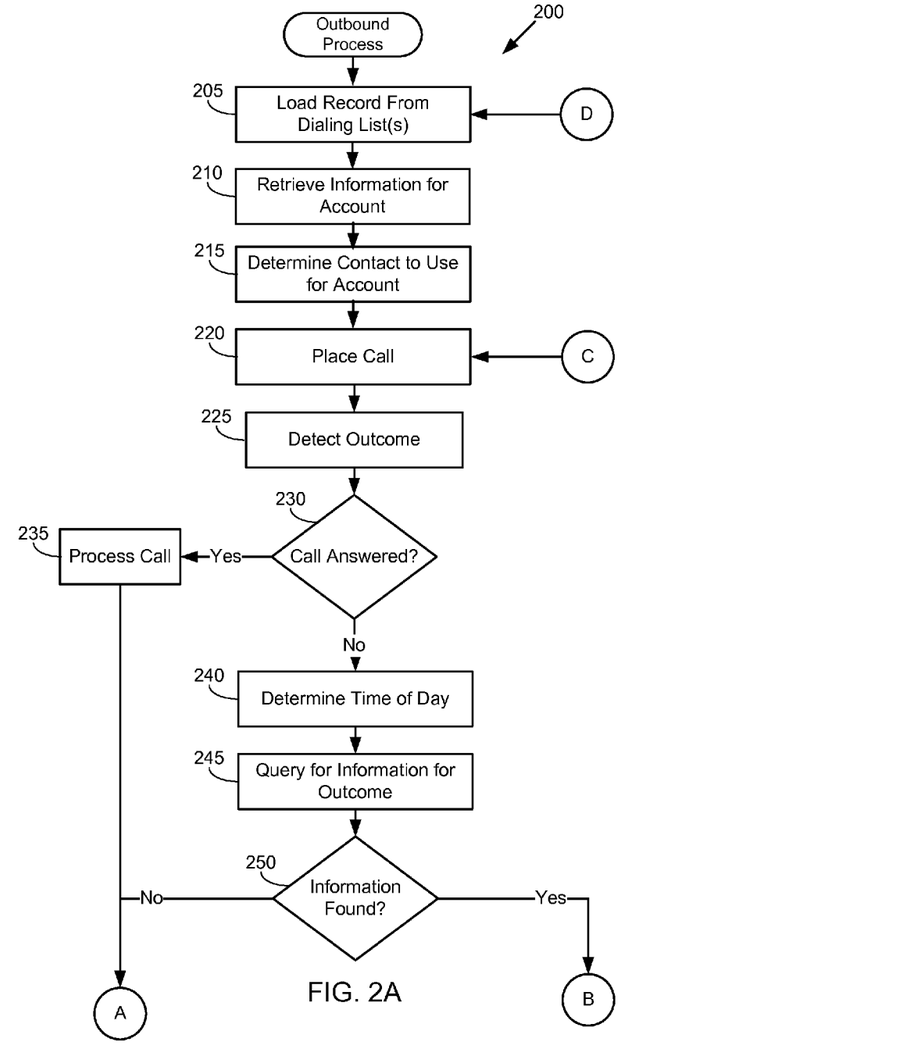
FIGS. 2A and 2B illustrate a process flow used for placing outbound telephone calls and handling outcomes in accordance with various embodiments of the invention.
Figure 2B:
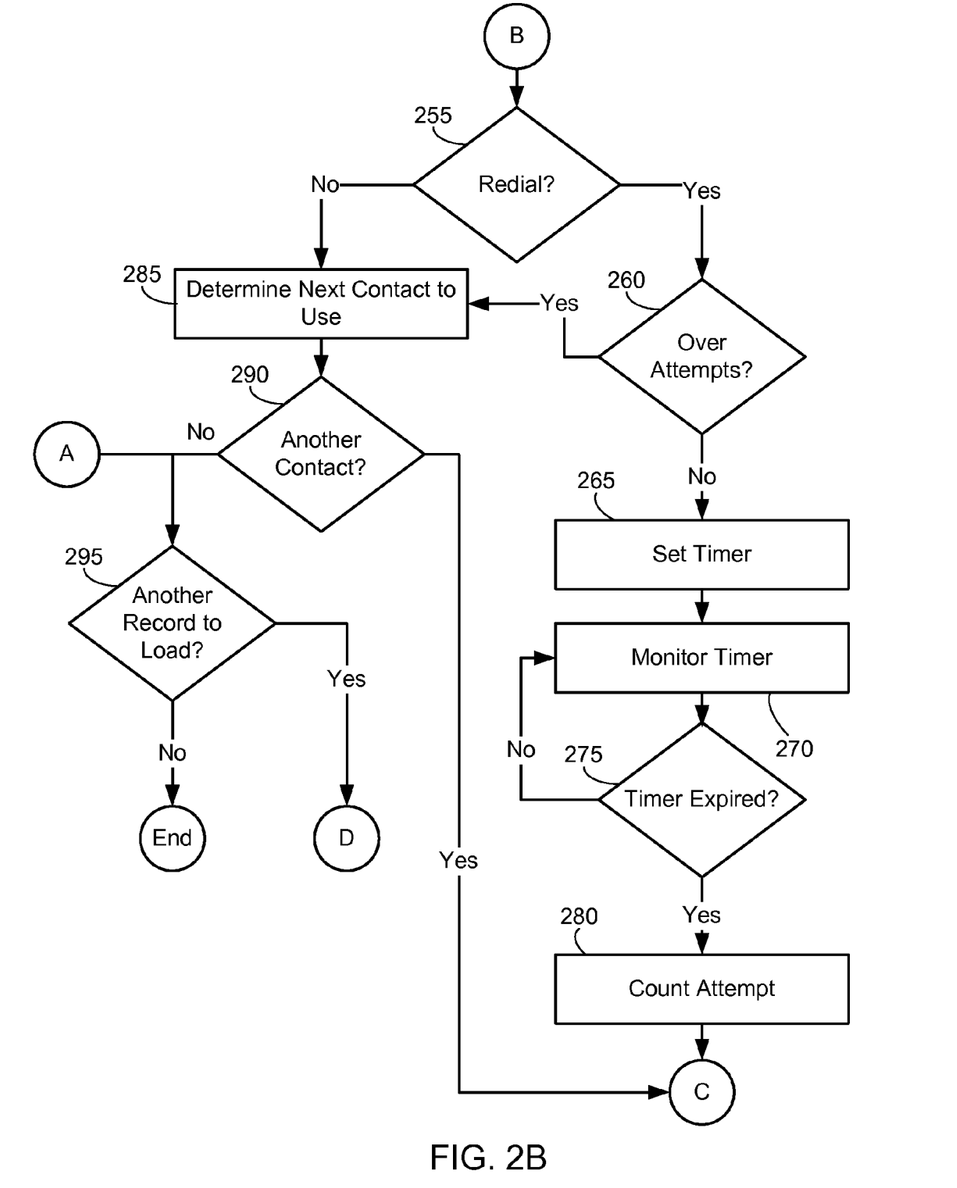

A process flow for placing one or more outbound calls to a particular targeted party according to various embodiments is shown in FIGS. 2A and 2B. In particular, FIGS. 2A and 2B are a flow diagram showing an outbound dialing module for performing such functionality. For example, the flow diagram shown in FIGS. 2A and 2B may correspond to operations carried out by a processor in a computing device, such as the dialer 150, as it executes the outbound dialing module stored in the computing device's volatile and/or nonvolatile memory.

In this instance, the call center employs one or more dialing lists containing records for individual targeted parties to have outbound calls placed to. For example, the call center may be conducting an outbound call campaign for a charity to solicit donations and the one or more dialing lists may comprise records for past donors to be contacted. Depending on the circumstances, the call center may process the records in the dialing lists sequentially, randomly, or by using some other type of ordering. Thus, turning now to FIG. 2A, the process 200 begins with the outbound dialing module loading a record from the one or more dialing lists in operation 205.

In particular embodiments, the dialing record typically includes some type of identification information for a particular targeted party. That is, for instance, the dialing record may include some type of identifier associated with the particular targeted party such as an account identifier for an account maintained for the particular targeted party by the call center. In these particular embodiments, the outbound dialing module uses the identifier to retrieve additional information from one or more data stores 175 typically located within the call center's system architecture 100 in operation 210.

Figure 3A:
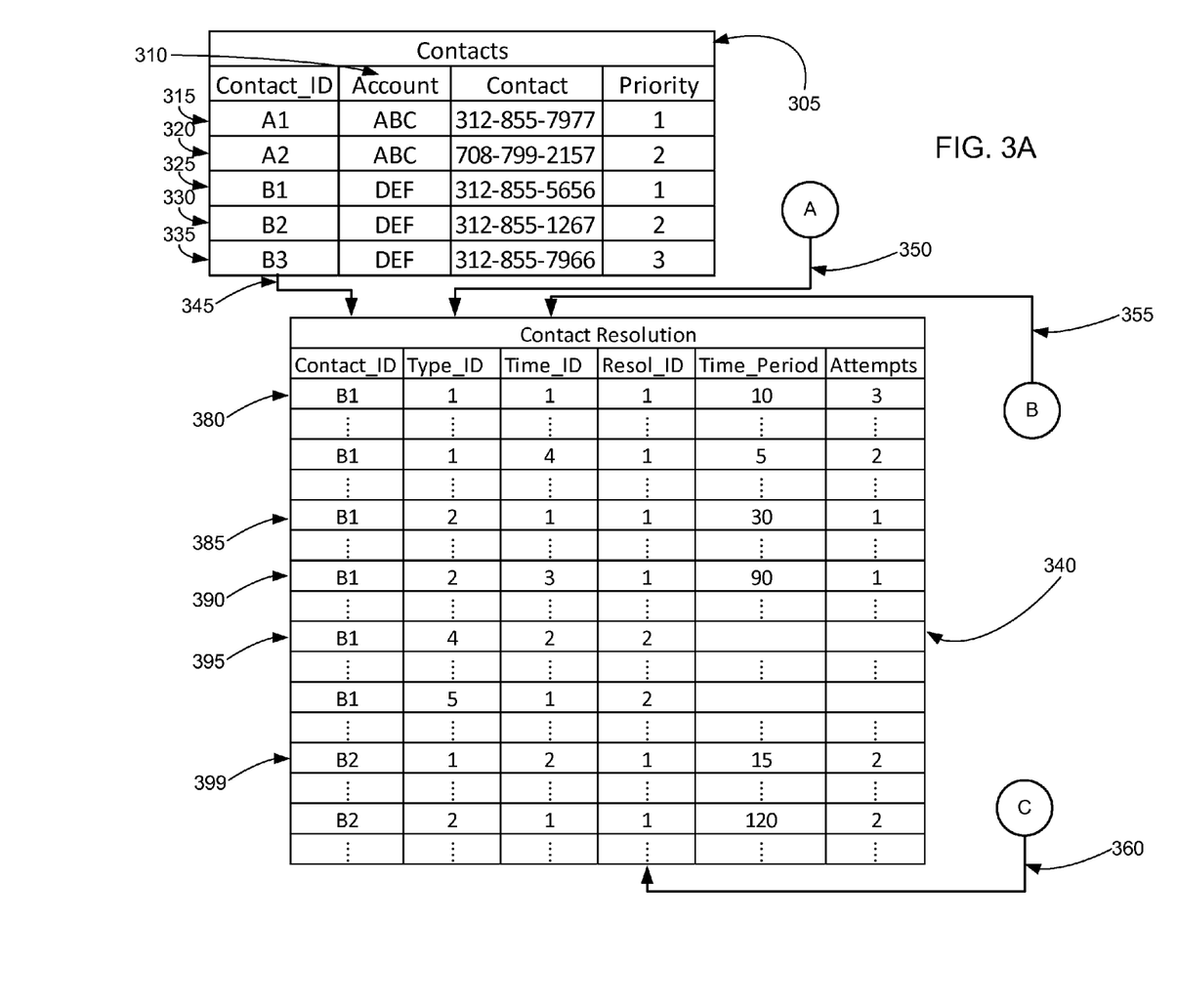
FIGS. 3A and 3B illustrate a layout for database tables used for practicing various aspects of the invention in accordance with various embodiments of the invention.

For example, turning now to FIG. 3A, this figure provides an illustration of a layout of database tables that may be used in various embodiments to store contact information for various targeted parties. In this example, a contacts table 305 includes a column 310 (e.g., field) that lists account identifiers for different targeted parties. For instance, an individual, Adrian Rohrer, who lives in Chicago, Ill., may be associated with an account having the identifier "ABC" and an individual, Ryan Liebl, who lives in Oak Park, Ill., may be associated with an account having the identifier "DEF." Thus, the table 305 includes two records 315, 320 for account ABC associated with Adrian Rohrer and three records 325, 330, 335 for account DEF associated with Ryan Liebl. For this particular example, each record represents a single contact for the particular account. For example, the first record 315 for Adrian may be a contact for his home telephone and the second record 320 for Adrian may be a contact for his cell phone.

Thus, in this instance, the record loaded by the outbound dialing module has the account identifier "DEF" and, in turn, the outbound dialing module queries the table 305 for at least one of the contacts for Ryan Liebl. Depending on the embodiment, the outbound dialing module may be configured to retrieve all of the contacts 325, 330, 335 for Ryan Liebl, one-at-a-time as needed, or any combination thereof. In this instance, the dialing module is configured to retrieve all of the contacts 325, 330, 335 along with their associated contact identifiers (e.g., "B1," "B2," and "B3"), telephone numbers (e.g., "312-855-5656," "312-855-1267," and "312-855-7966"), and priorities (e.g., "1," "2," and "3") respectively.

Returning to FIG. 2A, at this point, the outbound dialing module determines which telephone number to dial for the account in operation 215. That is, returning to the example, the outbound dialing module evaluates the priorities for the contacts 325, 330, 335 to determine which of the telephone numbers to initially use to attempt to contact Ryan Liebl. For this particular example, the priorities are numbered sequentially to identify the order in which the telephone numbers should be used to attempt to contact Ryan Liebl. Therefore, the outbound dialing module selects the contact 325 for telephone number "312-855-5656" since this particular contact 325 has a priority of "1."

However, it should be apparent to those of ordinary skill in the art in light of this disclosure that the priority for each contact may be defined differently depending on the embodiment. For instance, in other embodiments, the priority may be defined by providing a weighted factor for each contact. For example, instead of setting the priorities for the contacts 325, 330, 335 associated with Ryan Liebl to "1", "2", and "3," the priorities may be set to "99," "50," and "25" respectfully. Thus, in this instance, the contact with the largest weighted factor for priority (e.g., "99") is initially selected. Under this arrangement, it may be easier to add a new contact if one is received for Ryan Liebl than if the priorities are numbered sequentially, especially if the call center wishes to place the new contact with respect to priority between two contacts already established for Ryan Liebl. For example, if the call center receives a new contact for Ryan Liebl and wishes to place the new contact between the contact 330 having telephone number "312-855-1267" and the contact 335 having telephone number "312-855-7966", all the call center would need to do is assign priority to the new number with a weighted factor greater than twenty-five and less than fifty. Those of ordinary skill in the art can envision other approaches that may be used for defining priority in light of this disclosure.

Once the outbound dialing module has identified the contact (e.g., the telephone number) to use to initially contact the targeted party, the outbound dialing module has an outbound call placed for the contact in operation 220. Thus, in particular embodiments, the outbound dialing module instructs the dialer 150 to dial the telephone number associated with the selected contact to attempt to reach the targeted party. Therefore, in the example, the outbound dialing module instructs the dialer 150 to dial the number "312-855-5656" to attempt to contact Ryan Liebl.

Depending on the contact, the dialed telephone number may be associated with any number of different devices such as, for example, a landline telephone, a wireless communication device, or a computer. In addition, the outbound call for the contact may encounter any number of different outcomes besides the targeted party answering the call. For instance, the outbound call may result in receiving a busy signal if the targeted party is currently using the device associated with the dialed contact. That is, at the time the outbound call is placed for telephone number "312-855-5656" to Ryan Liebl's home telephone, Ryan may currently be on another call and he does not have call waiting or voice mail. Therefore, the outbound call results in receiving a busy signal. In another instance, the outbound call may result in detecting some type of automated answering. That is, at the time the outbound call is placed to Ryan Liebl's home telephone, Ryan may not be home and after a certain number of rings, voice mail or an answering machine may pick up the call. While in another instance, the outbound call may result in a no-answer condition. That is, at the time the outbound call is placed to Ryan Liebl's home telephone, Ryan may not be home and he does not have voice mail or an answering machine. In this instance, the dialer 150 may wait for a particular number of ring cycles and then terminate the call. While in another instance, Ryan may no longer use the particular contact and the telephone number may be out-of-service. Thus, the dialer 150 encounters an indication that the telephone number is no longer in service.

Therefore, returning to FIG. 2A, the outbound dialing module detects an outcome for the outbound call placed to the targeted party in operation 225. Thus, in particular embodiments, the dialer 150 initially detects an outcome to the outbound call and communicates such to the outbound dialing module. For instance, in particular embodiments, the dialer 150 detects whether the outbound call has been answered, resulted in a busy signal, picked up by voice mail or answering machine, continued to ring until it was terminated, or resulted in an indication that the number is no longer in service. After detecting an outcome for the call, the dialer 150 then notifies the outbound dialing module of the outcome. At this point, the outbound dialing module determines if the outbound call has been answered in operation 230. Is so, the outbound dialing module processes the call in operation 235. That is, for instance, in particular embodiments, the outbound dialing module has the call forwarded to one of the agents at the call center to be handled.

However, in this instance, the dialer 150 encounters a busy signal from calling Ryan Liebl's home telephone and conveys this outcome to the outbound dialing module. In turn, the outbound dialing module determines the call has not been answered and, accordingly, determines the time of day in operation 240. Depending on the embodiment, the time of day may be represented in a number of different ways. For instance, in particular embodiments, the time of day may be represented as an approximate time of day the outbound call was made. For example, the outbound call may have been placed to Ryan's home telephone at eight o'clock in morning local time and thus the time of day for the call is 8:00 o'clock a.m. While in other embodiments, the time of day may be represented as a segment of the day such as, for example, morning, afternoon, evening, and night. In these embodiments, the outbound dialing module may determine the time of day based on an approximate time of the outbound call. For instance, the morning segment may be defined as occurring from seven o'clock a.m. to eleven o'clock a.m. local time. Thus, if the actual time of day the call was placed is eight o'clock a.m. local time, then the outbound dialing module would identify the time of day for the outbound call as being morning. Those of ordinary skill in the art can envision multiple ways of representing the time of day in light of this disclosure. However, with respect to the example involving placing the outbound call to Ryan Liebl's home telephone, the call was made at eight o'clock a.m. and the outbound dialing module identifies the time of day as morning.

Continuing on with the process 200, the outbound dialing module next queries for information with respect to how the module should handle the outcome in operation 245. Thus, turning back to FIG. 3A, in various embodiments, the outbound dialing module queries the contact resolution table 340 to gather information on how to handle receiving a busy signal from placing an outbound call to Ryan's home telephone. From the table layout shown in FIG. 3A, one can see a relationship 345 exists between the contacts table 305 and the contact resolution table 340 with respect to contact identifier. Likewise, looking at both FIGS. 3A and 3B, a relationship 350 exists between the outcome type table 365 and the contact resolution table 340 based on outcome type, a relationship 355 exists between the time of day table 370 and the contact resolution table 340 based on time of day, and a relationship 360 exists between the resolution table 375 and the contact resolution table 230 based on a resolution for the outcome to the call. Thus, in the example, as a result of receiving a busy signal for the outbound call placed to Ryan Liebl's home telephone during the morning, the outbound dialing module queries the contact resolution table 340 with the input variables of Contact_ID="B1" for contact "312-855-5656", Type_ID="1" for a busy signal, and Time_ID="1" for the morning time of the day. As a result, the outbound dialing module receives information for a record 380 having this combination of variables in the appropriate fields. That is, in the example, the outbound dialing module receives a Resol_ID="1" for redialing, a Time_Period of 10 minutes, and an Attempts of three.

Figure 3B:
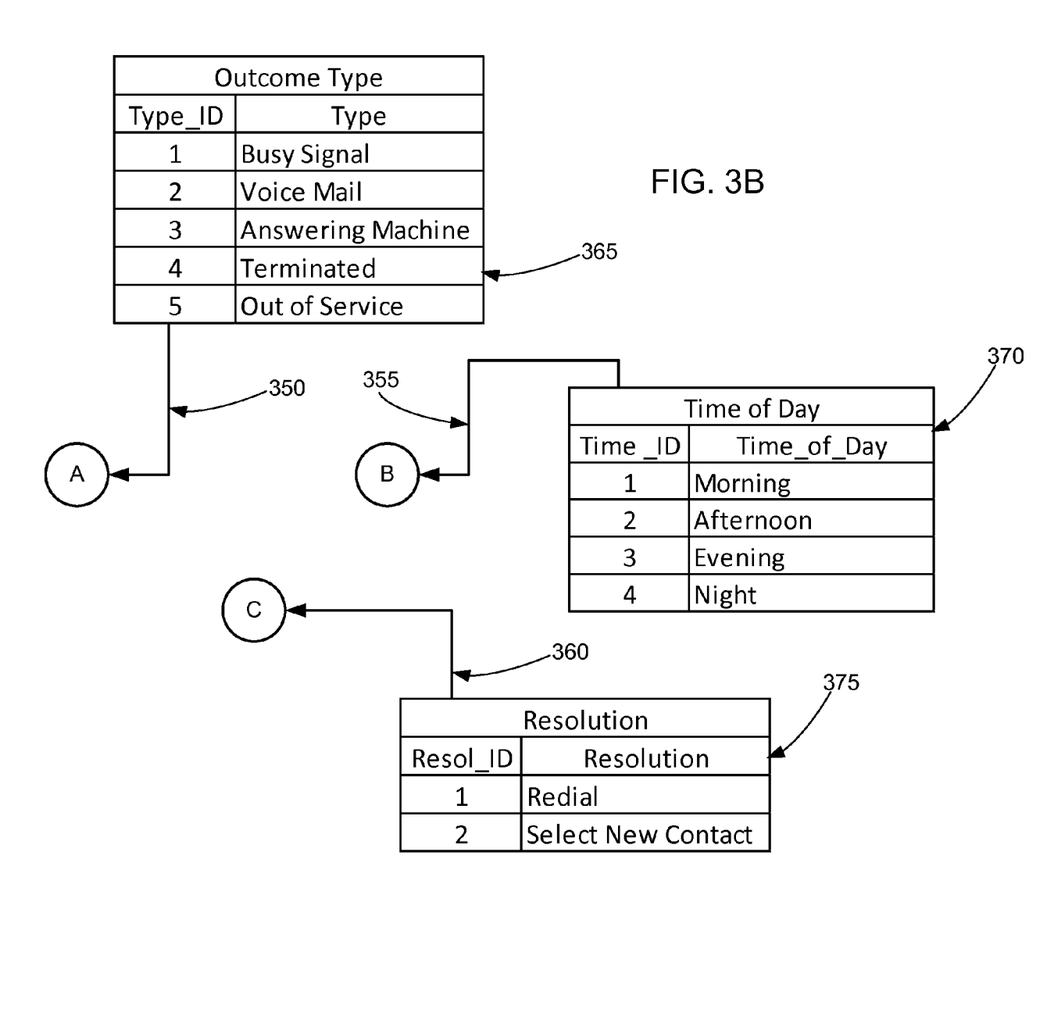

It should be noted that the database table layout provided in FIGS. 3A and 3B is but one of a number of different layouts that may be used in conjunction with various aspects of the invention without departing from the spirit of the invention. That is, for example, the tables shown in the layout provided in FIGS. 3A and 3B may be modified to include additional fields or to delete fields as well as tables may be added or combined in the layout without departing from the spirit of the invention. For instance, one embodiment of the database table layout may also include a table with respect to day of the week so that the resolutions employed for the various outcomes may also be based on what day of the week the outbound call is placed. Furthermore, in various embodiments, the table layout may be based on other criteria besides accounts for targeted parties. For instance, in particular embodiments, the table layout may be based on outbound call campaigns and resolutions to various outcomes for outbound calls may be based on the call campaigns for the particular outbound calls as opposed to the particular targeted parties. Those of ordinary skill in the art can envision multiple versions of database table layouts that may be used to practice various aspects of the invention in light of this disclosure. Thus, the specific layout provided in FIGS. 3A and 3B should not be interpreted to limit the scope of the invention.

Returning now to FIG. 2A, once the outbound dialing module has queried information on how to handle the outcome to the outbound call, the outbound dialing module determines whether such information was found in operation 250. If no specific information exists with respect to the outcome of the outbound call, then, as shown in FIG. 2B, the outbound dialing module determines whether there is another record in the dialing lists to load in operation 295. If so, then the outbound dialing module returns to operation 205 and loads the next record for the dialing lists.

However, if specific information does exists with respect to the outcome of the outbound call, then the outbound dialing module determines whether the resolution to the outcome is to redial the contact to place a subsequent outbound call to attempt to reach the targeted party in operation 255. Thus, returning to the example, the information queried for handling the busy signal received for the outbound call placed to Ryan's home telephone number indicates that a redial of the number should be made (i.e., the Resol_ID="1"). As a result, the outbound dialing module determines whether the attempts to reach the targeted party using the particular contact have reached the maximum allowed in operation 260. That is, in the example, the outbound dialing module determines whether three attempts have already been made to try and reach Ryan Liebl using the telephone number "312-855-5656" based on the Attempts value queried from the contact resolution table 340. In this instance, only one attempt has been made to try and reach Ryan at the telephone number "312-855-5656." Therefore, the outbound dialing module sets a timer in operation 265 to ten minutes based on the Time_Period value queried from the contact resolution table 340 and monitors the timer in operation 270.

It should be noted that in particular embodiments, the attempts may be associated with the contact or the targeted party as opposed to the outcome. For example, the three attempts that may be made to Ryan's home telephone may be a total of three attempts regardless of the outcome for each attempt. This type of configuration may be favored in instances in which regulations are placed on the number of times a call center may place a call to a particular contact or to a particular party over a defined period of time. Thus, in particular instances, the Attempts value may be found in the contacts table 305 instead of the contact resolution table 340. Furthermore, the attempts may be tracked using any one of a number of different mechanisms such as counter variables within the outbound dialing module and/or counter fields stored in one or more of the tables for the database layout.

At this point, the outbound dialing module periodically (e.g., every fifteen seconds) determines whether the timer has expired in operation 275. If the outbound dialing module determines the timer has expired, then the module counts the attempt about to be made to reach the targeted party for the contact in operation 280 and returns to operation 220 (in FIG. 2A) to place a subsequent outbound call for the contact. Thus, in the example, if the outbound dialing module determines ten minutes has passed since the initial outbound call was made to Ryan's home telephone, then the outbound dialing module counts the attempt about to be made to contact Ryan on his home telephone and instructs the dialer 150 to again dial the telephone number "312-855-5656" to attempt to contact Ryan.

At this point, the process 200 is repeated for the subsequent outbound call made to Ryan's home telephone. For instance, the outbound dialing module may determine the outcome to the subsequent outbound call is the call results in reaching Ryan's voice mail. Turning to FIG. 3A, since the time of day is still morning, the outbound dialing module queries the contact resolution table 340 and receives a record 385 in which the Contact_ID="B1," the Type_ID="2," and the Time_ID="1." Thus, in this instance, the information returned to the outbound dialing module is a resolution to redial the number (Resol_ID="1") to make another subsequent outbound call to Ryan's home telephone after thirty minutes has passed (Time_Period="30"). In response, the outbound dialing module checks to make sure the attempt is allowed and if so, sets the timer to thirty minutes, monitors the timer to detect when the timer expires, counts the attempt to be made, and places the call to Ryan's home telephone number.

For the embodiment of the outbound dialing module shown in FIGS. 2A and 2B, the module may be configured to handle various outcomes to outbound calls differently. For instance, if an outbound call is placed to Ryan's home telephone in the afternoon and the call continues to ring until it is terminated, then the outbound dialing module queries the contact resolution table 340 and receives a record 395 that indicates that the resolution to this outcome is to select a new contact (Resol_ID="2"). Therefore, looking at FIG. 2B, in operation 255, the outbound dialing module determines that the resolution to terminating the call to Ryan's home telephone is not redialing the number to place a subsequent call to his home telephone. Instead, the outbound dialing module determines whether there is another contact (e.g., telephone number) for Ryan that may be used to attempt to reach him in operation 285. In this instance, the call center has two additional contacts 330, 335 for Ryan with the contact 330 for telephone number "312-855-1267" having priority over the contact 335 for telephone number "312-855-7966." In this particular instance, the contact 330 for telephone number "312-855-1267" is for Ryan's cell phone. Thus, the outbound dialing module determines in operation 290 there is another contact for Ryan and repeats the process 200 to place an outbound call to Ryan's cell phone. At this point, the outbound dialing module treats the outbound call placed to Ryan's cell phone in the same manner as the module treated the outbound calls placed to Ryan's home telephone. That is, for instance, if the outcome to placing an initial call to Ryan's cell phone is a busy signal, looking at FIG. 3A, the outbound dialing module would query the contact resolution table 340 and receive a record 399 indicating that a subsequent call should be placed to Ryan's cell phone after fifteen minutes of time has passed.

Thus, considering the embodiment of the outbound dialing module illustrated in FIGS. 2A and 2B and the embodiment of the table structure layout for the database in FIGS. 3A and 3B, one can notice that such embodiments provide the call center with a great amount of flexibility and customization with respect to how different contacts for a targeted party may be handled based on outcomes to outbound calls placed to the contacts at various times of the day. For example, looking at FIG. 3A, a record 390 is placed in the contact resolution table 340 to handle a situation in which an outbound call is placed to Ryan Liebl's home telephone (Contact_ID="B1,") in the evening (Time_ID="3") and the outcome of the call is Ryan's voice mail picks up the call (Type_ID="2"). In this instance, the outbound dialing module is to resolve the outcome of the call by redialing the number, but instead of redialing the number after ten or thirty minutes, the outbound dialing module redials the number after ninety minutes. This is because, for this outcome occurring in the evening, the call center may wish to wait an additional amount of time before placing a subsequent call to Ryan's home telephone because such an outcome at this time of the day may more likely indicate that either Ryan is not currently at home or if he is home, he is not currently answering calls. Therefore, the call center may find that it is more efficient and/or effective to wait additional time before placing a subsequent call to Ryan's home telephone number when the initial call is made in the evening and encounters Ryan's voice mail pick up or a no-answer condition. Likewise, if the outcome to an outbound call placed to Ryan's home telephone in the morning is a busy signal or voice mail immediately answers, then it is likely someone is currently on another call using Ryan's home telephone. Therefore, the likelihood of successfully reaching a party at Ryan's home telephone is high and consequently the call center may want to make a subsequent call to Ryan's home telephone number after a short amount of time has passed (e.g., ten minutes). Those of ordinary skill in the art can envision numerous combinations that may be made in light of this disclosure with respect to the targeted party, type of contact device (e.g., a landline device versus a wireless communication device), outcome to an outbound call placed to the contact device, and time of day (and/or day of week) the outbound call is placed.

Exemplary Computer Processing Device

Figure 4:
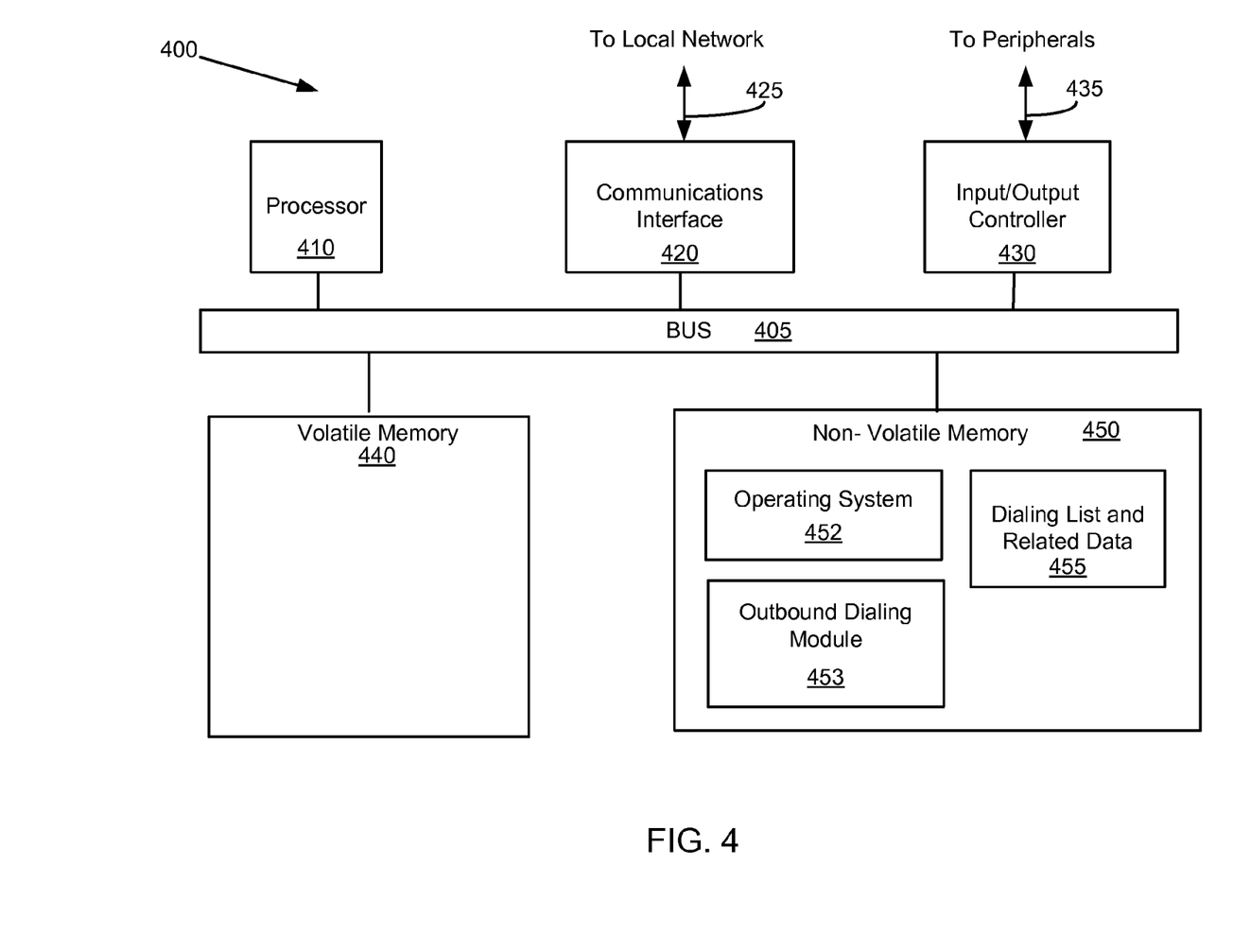
FIG. 4 illustrates one embodiment of a processing device for practicing the technologies and concepts disclosed herein.

FIG. 4 is an exemplary schematic diagram of a computer processing system that may be used in an embodiment of the call center architecture to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 4, the processing system 400 may include one or more processors 410 that may communicate with other elements within the processing system 400 via a bus 405. The processor 410 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 400 may also include one or more communications interfaces 420 for communicating data via the local network 170 with various external devices, including those shown in FIG. 1. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 430 may also communicate with one or more input devices or peripherals using an interface 435, such as, but not limited to: a keyboard, a mouse, a touch screen/display input, microphone, pointing device, etc. The input/output controller 430 may also communicate with output devices or peripherals, such as displays, printers, speakers, headsets, banner displays, etc. These may be used, in part, to receive Administrator input, including for interacting with the manual agent selection module.

The processor 410 may be configured to execute instructions stored in volatile memory 440, non-volatile memory 450, or other forms of computer readable storage media accessible to the processor 410. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 450 may store program code and data, which also may be loaded into the volatile memory 440 at execution time. Specifically, the non-volatile memory 450 may store one or more modules, such as an outbound dialing module 453, that may perform the above mentioned process flows and/or operating system code 452 containing instructions for performing the process and/or functions associated with the technologies disclosed herein. The outbound dialing module 453 may also access, generate, and/or store related data 455, such as one or more dialing lists and/or contact resolutions tables, in the non-volatile memory 450, as well as in the volatile memory 440. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 410. These may form a part of, or may interact with, the outbound dialing module 453.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method comprising the steps of:
   selecting a first telephone number associated with an account for a targeted party;
   dialing the first telephone number by a dialer to place an initial outbound telephone call to the targeted party;
   after automatically detecting a busy signal for the initial outbound telephone call, dialing the first telephone number by the dialer to place a subsequent outbound telephone call to the targeted party after waiting a first predetermined period of time, wherein waiting the first predetermined period of time before dialing the first telephone number to place the subsequent outbound telephone call is based on detecting the busy signal for the initial outbound telephone call;
   after automatically detecting an automated answering device for the initial outbound telephone call, dialing the first telephone number by the dialer to place the subsequent outbound telephone call to the targeted party after waiting a second predetermined period of time, wherein waiting the second predetermined period of time before dialing the first telephone number to place the subsequent outbound telephone call is based on detecting the automated answering device for the initial outbound telephone call and the second predetermined period of time is different than the first predetermined period of time; and after automatically detecting a no-answer condition for the initial outbound telephone call,
- selecting a second telephone number associated with the account for the targeted party; and
- dialing the second telephone number by the dialer to place the subsequent outbound telephone call to the targeted party.

2. The method of claim 1, wherein the first predetermined period of time and the second predetermined period of time are specified by the account for the targeted party.

3. The method of claim 1, wherein the automated answering device comprises at least one of a voice mail and an answering machine.

4. The method of claim 1 further comprising the step of detecting the no-answer condition for the initial outbound telephone call by not detecting the busy signal or the automated answering device after a predetermined number of ring cycles.

5. The method of claim 1 further comprising the step of detecting the no-answer condition for the initial outbound telephone call by detecting an out-of-service condition for the first telephone number.

6. The method of claim 1, wherein the first telephone number is associated with a landline telephone device and the second telephone number is associated with a wireless communication device.

7. The method of claim 1, wherein the first telephone number is initially selected because the account for the targeted party indicates the first telephone number has a priority over the second telephone number.

8. The method of claim 1, wherein:
- dialing the first telephone number by the dialer to place the subsequent outbound telephone call to the targeted party after waiting the first predetermined period of time is performed as a result of an attempt to reach the targeted party by placing the subsequent outbound telephone call not being greater than a first attempt value, and
- dialing the first telephone number by the dialer to place the subsequent outbound telephone call to the targeted party after waiting the second predetermined period of time is performed as a result of the attempt to reach the targeted party by placing the subsequent outbound telephone call not being greater than a second attempt value.

9. The method of claim 1, wherein waiting the first predetermined period of time or the second predetermined period of time before dialing the first telephone number to place the subsequent outbound telephone call is also based on a time of day the initial outbound telephone call is placed.

10. A non-transitory, computer-readable medium comprising computer-executable instructions for causing at least one computer processor to:
- select a first telephone number associated with an account for a targeted party;
- have the first telephone number dialed to place an initial outbound telephone call to the targeted party;
- after automatically detecting a busy signal for the initial outbound telephone call, have the first telephone number dialed to place a subsequent outbound telephone call to the targeted party after waiting a first predetermined period of time, wherein waiting the first predetermined period of time before having the first telephone number dialed to place the subsequent outbound telephone call is based on detecting the busy signal for the initial outbound telephone call;
- after automatically detecting an automated answering device for the initial outbound telephone call, have the first telephone number dialed to place the subsequent outbound telephone call to the targeted party after waiting a second predetermined period of time, wherein waiting the second predetermined period of time before having the first telephone number dialed to place the subsequent outbound telephone call is based on detecting the automated answering device for the initial outbound telephone call and the second predetermined period of time is different than the first predetermined period of time; and
- after automatically detecting a no-answer condition for the initial outbound telephone call,
  - select a second telephone number associated with the account for the targeted party; and
  - have the second telephone number dialed to place the subsequent outbound telephone call to the targeted party.

11. The non-transitory, computer-readable medium of claim 10, wherein the first predetermined period of time and the second predetermined period of time are specified by the account for the targeted party.

12. The non-transitory, computer-readable medium of claim 10, wherein the automated answering device comprises at least one of a voice mail and an answering machine.

13. The non-transitory, computer-readable medium of claim 10, wherein the computer-executable instructions are further configured to cause the at least one computer processor to detect the no-answer condition for the initial outbound telephone call by not detecting the busy signal or the automated answering device after a predetermined number of ring cycles.

14. The non-transitory, computer-readable medium of claim 10, wherein the computer-executable instructions are further configured to cause the at least one computer processor to detect the no-answer condition for the initial outbound telephone call by detecting an out-of-service condition for the first telephone number.

15. The non-transitory, computer-readable medium of claim 10, wherein the first telephone number is associated with a landline telephone device and the second telephone number is associated with a wireless communication device.

16. The non-transitory, computer-readable medium of claim 10, wherein the first telephone number is initially selected because the account for the targeted party indicates the first telephone number has a priority over the second telephone number.

17. The non-transitory, computer-readable medium of claim 10, wherein the computer-executable instructions are further configured to cause the at least one computer processor to:
- have the first telephone number dialed to place the subsequent outbound telephone call to the targeted party after waiting the first predetermined period of time as a result of an attempt to reach the targeted party by placing the subsequent outbound telephone call not being greater than a first attempt value, and
- have the first telephone number dialed to place the subsequent outbound telephone call to the targeted party after waiting the second predetermined period of time as a result of the attempt to reach the targeted party by placing the subsequent outbound telephone call not being greater than a second attempt value.

18. The non-transitory, computer-readable medium of claim 10, wherein waiting the first predetermined period of time or the second predetermined period of time before dialing the first telephone number to place the subsequent outbound telephone call is also based on a time of day the initial outbound telephone call is placed.

19. A system comprising:
memory storing an account for a targeted party; and
at least one computer processor configured to:
- select a first telephone number associated with the account from the memory;
- have the first telephone number dialed to place an initial outbound telephone call to the targeted party;
- after automatically detecting a busy signal for the initial outbound telephone call, have the first telephone number dialed to place a subsequent outbound telephone call to the targeted party after waiting a first predetermined period of time, wherein waiting the first predetermined period of time before having the first telephone number dialed to place the subsequent outbound telephone call is based on detecting the busy signal for the initial outbound telephone call;
- after automatically detecting an automated answering device for the initial outbound telephone call, have the first telephone number dialed to place the subsequent outbound telephone call to the targeted party after waiting a second predetermined period of time, wherein waiting the second predetermined period of time before having the first telephone number dialed to place the subsequent outbound telephone call is based on detecting the automated answering device for the initial outbound telephone call and the second predetermined period of time is different than the first predetermined period of time; and
- after automatically detecting a no-answer condition for the initial outbound telephone call,
  - select a second telephone number associated with the account from the memory; and
  - have the second telephone number dialed to place the subsequent outbound telephone call to the targeted party.

20. The system of claim 19, wherein the first predetermined period of time and the second predetermined period of time are specified for the account for the targeted party.

21. The system of claim 19, wherein the automated answering device comprises at least one of a voice mail and an answering machine.

22. The system of claim 19, wherein the at least one computer processor is further configured to detect the no-answer condition for the initial outbound telephone call by not detecting the busy signal or the automated answering device after a predetermined number of ring cycles.

23. The system of claim 19, wherein the at least one computer processor is further configured to detect the no-answer condition for the initial outbound telephone call by detecting an out-of-service condition for the first telephone number.

24. The system of claim 19, wherein the first telephone number is associated with a landline telephone device and the second telephone number is associated with a wireless communication device.

25. The system of claim 19, wherein the first telephone number is initially selected because the account for the targeted party indicates the first telephone number has a priority over the second telephone number.

26. The system of claim 19, wherein the at least one computer processor is further configured to:
- have the first telephone number dialed to place the subsequent outbound telephone call to the targeted party after waiting the first predetermined period of time as a result of an attempt to reach the targeted party by placing the subsequent outbound telephone call not being greater than a first attempt value, and
- have the first telephone number dialed to place the subsequent outbound telephone call to the targeted party after waiting the second predetermined period of time as a result of the attempt to reach the targeted party by placing the subsequent outbound telephone call not being greater than a second attempt value.

27. The system of claim 19, wherein waiting the first predetermined period of time or the second predetermined period of time before dialing the first telephone number to place the subsequent outbound telephone call is also based on a time of day the initial outbound telephone call is placed.

* * * * *